United States Patent [19]
Lanciault

[11] 3,973,553
[45] Aug. 10, 1976

[54] COMBINATION SOLAR HEAT COLLECTOR AND AWNING

[76] Inventor: Joseph A. Lanciault, 16 Prichard St., Apt. 710, Fitchburg, Mass. 01420

[22] Filed: July 7, 1975

[21] Appl. No.: 593,557

[52] U.S. Cl. .............................................. 126/271
[51] Int. Cl.² ............................................. F24J 3/02
[58] Field of Search ............ 126/270, 271; 237/1 A; 296/137 R–137 J

[56] References Cited
UNITED STATES PATENTS

| | | | |
|---|---|---|---|
| 2,489,751 | 11/1949 | Candler, Jr. | 126/271 |
| 3,595,216 | 7/1971 | Lanciault | 126/271 |
| 3,823,703 | 7/1974 | Lanciault | 126/271 |

Primary Examiner—Kenneth W. Sprague
Assistant Examiner—James C. Yeung
Attorney, Agent, or Firm—Victor J. Evans & Co.

[57] ABSTRACT

A combination solar heat collector and awning is disclosed as an attachment for a travel trailer or mobile home wherein the heat collector panel is extendable to an awning position overlying the wall of the vehicle which should be facing toward the sun. The heat collector panel has water pipes extending therethrough which provide heated water to a tank mounted on the roof of the vehicle and connected to the domestic hot water system of the trailer or to heat radiators as desired.

The heat collector panel is extendable and retractable with a cable system which is selectively motor operated or hand operated. The total unit when in stored position or in position of use has a relatively low silhouette and permits passage of the vehicle through normal roadways.

5 Claims, 6 Drawing Figures

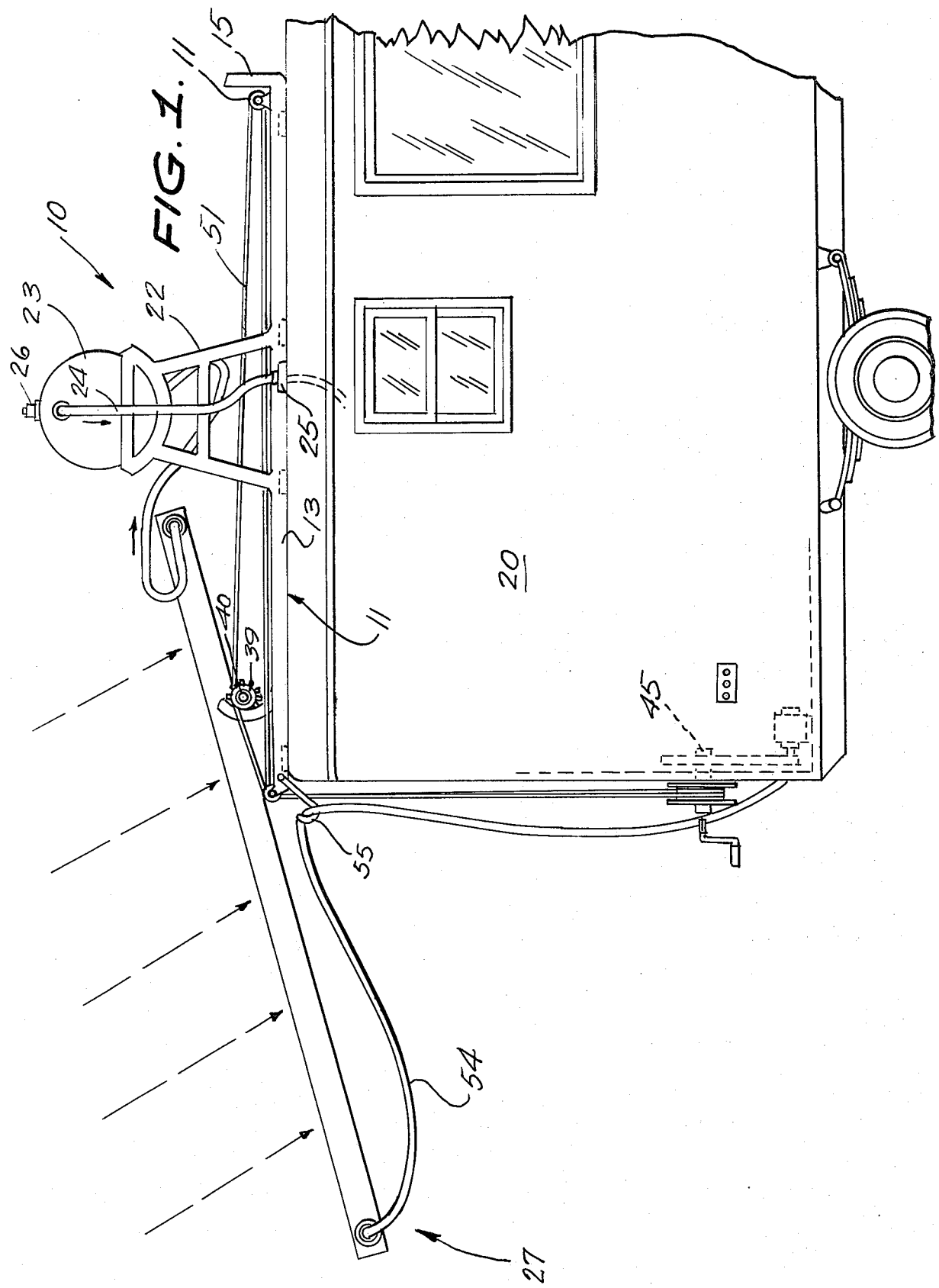

COMBINATION SOLAR HEAT COLLECTOR AND AWNING

BACKGROUND OF THE INVENTION

1. Field of the Invention

The present invention relates to combined solar heat collectors and awnings as attachments for travel trailers or mobile homes.

2. Summary of the Invention

The present invention includes a solar heat collector panel mounted on the roof of a mobile home or travel trailer and extendable to a position overlying one wall of the trailer so as to act as an awning for that wall while collecting solar heat by heating water which can be used as domestic hot water or for heating radiators. The panel is extendable and retractable by a cable system driven by a battery operated electric motor or by a hand crank.

The primary object of the invention is to provide a solar heat collector and awning combination which will have a low silhouette and permit the vehicle to be used on normal roadways.

Other objects and advantages will become apparent in the following specification when considered in light of the attached drawings.

BRIEF DESCRIPTION OF THE DRAWINGS

FIG. 1 is a side elevation of the invention shown in extended position for producing hot water;

DESCRIPTION OF THE PREFERRED EMBODIMENT

Figure 3:
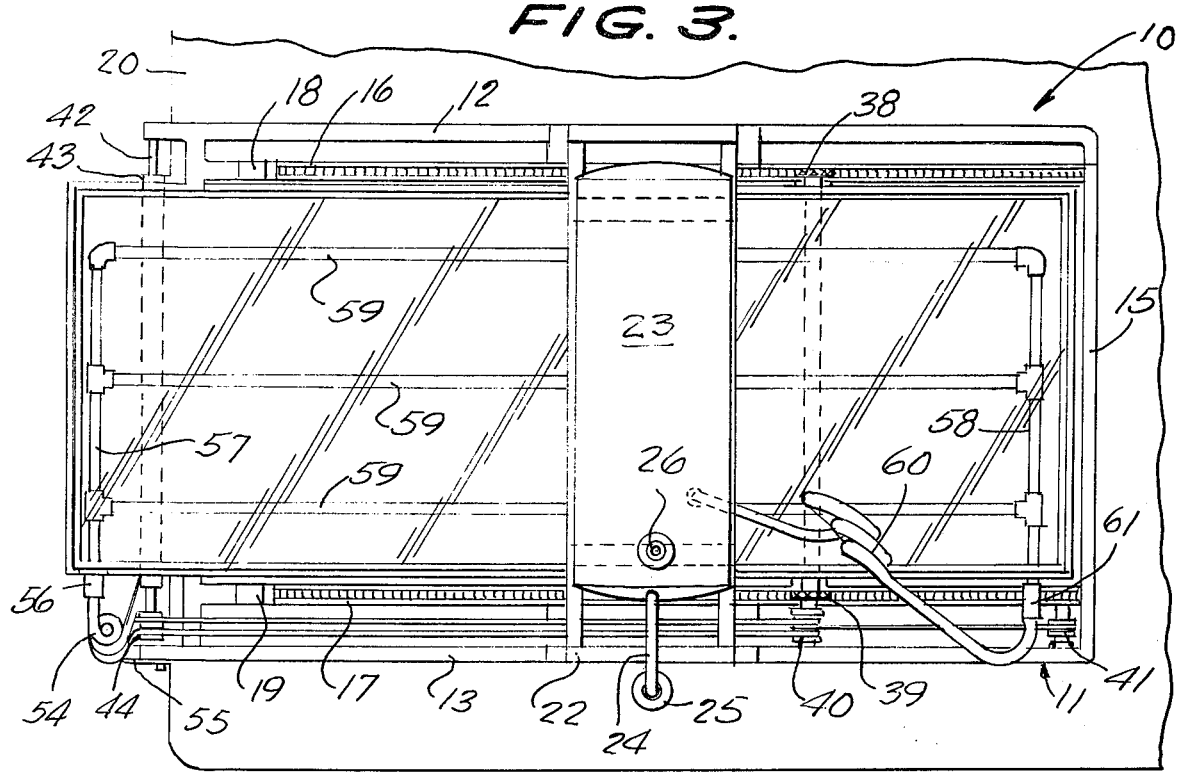
FIG. 3 is a top plan view of the invention in stored position.

Referring now to the drawings in detail wherein like reference characters indicate like parts throughout the several Figures the reference numeral 10 indicates generally a combined solar water heater and retractable awning unit for attachment to travel trailers and mobile homes. The unit 10 includes a base 11 having a pair of spaced apart parallel longitudinally extending frame members 12, 13 connected by a plurality of generally horizontal cross members 14.

A front end wall 15 extends between the frames 12, 13 and projects upwardly therefrom. A cog track 16 and a second cog track 17 extend longitudinally in spaced parallel relation and are secured to the cross members 14 between the side frames 12, 13. The rear ends of the cog tracks 16, 17 are curved upwardly in a generally U-shaped end portion 18, 19 respectively.

The base member 11 is secured to the roof of the vehicle 20 by means of adhesive 21. A tank support trestle 22 is mounted on the side frames 12, 13 supporting an insulated elevated hot water tank 23 above the base 11. A conduit 24 extends downwardly through a fitting 25 in the roof of the vehicle 20 to provide hot water to the domestic system (not shown) within the vehicle 20. A vacuum valve 26 on the tank 23 permits air to enter the tank 23 as water flows outwardly therefrom through the conduit 24.

Figure 4:
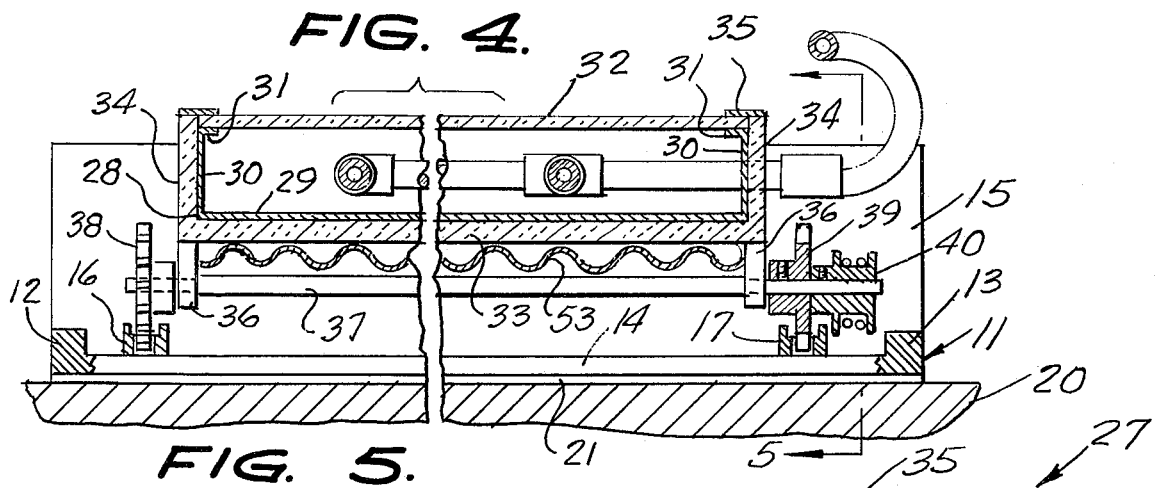
FIG. 4 is an enlarged fragmentary vertical sectional view taken on the line 4—4 of FIG. 2 looking in the direction of the arrows.

A heat collector panel indicated generally at 27 includes a metal box 28 having a generally flat rectangular bottom wall 29 and upstanding side walls 30 including a horizontal flange 31 at the upper edge thereof. A generally rectangular plate glass or fiber-glass window 32 is supported on the flanges 31 as can be seen in FIG. 4.

An insulation panel 33 is beneath the bottom wall 29 and secured thereto. Insulation panels 34 are secured to all of the side walls 30 and the insulation panel 33. A retainer frame 35 is secured to the insulation panels 34 and extends over the edges of the window 32 to secure the window 32 in place.

Brackets 36 extend downwardly from opposite sides of the box 27 and have an axle 37 journalled therein and extending transversely of the unit 10. The axle 37 has a spur gear 38 rigidly secured to one end thereof and meshing with the cog track 16. A spur gear 39 is rigidly secured to the opposite end of the axle 37 meshing with the cog track 17. A drum 40 is rigidly secured to the outer end of the axle 37 adjacent to the spur gear 39 for reasons to be assigned.

Figure 2:
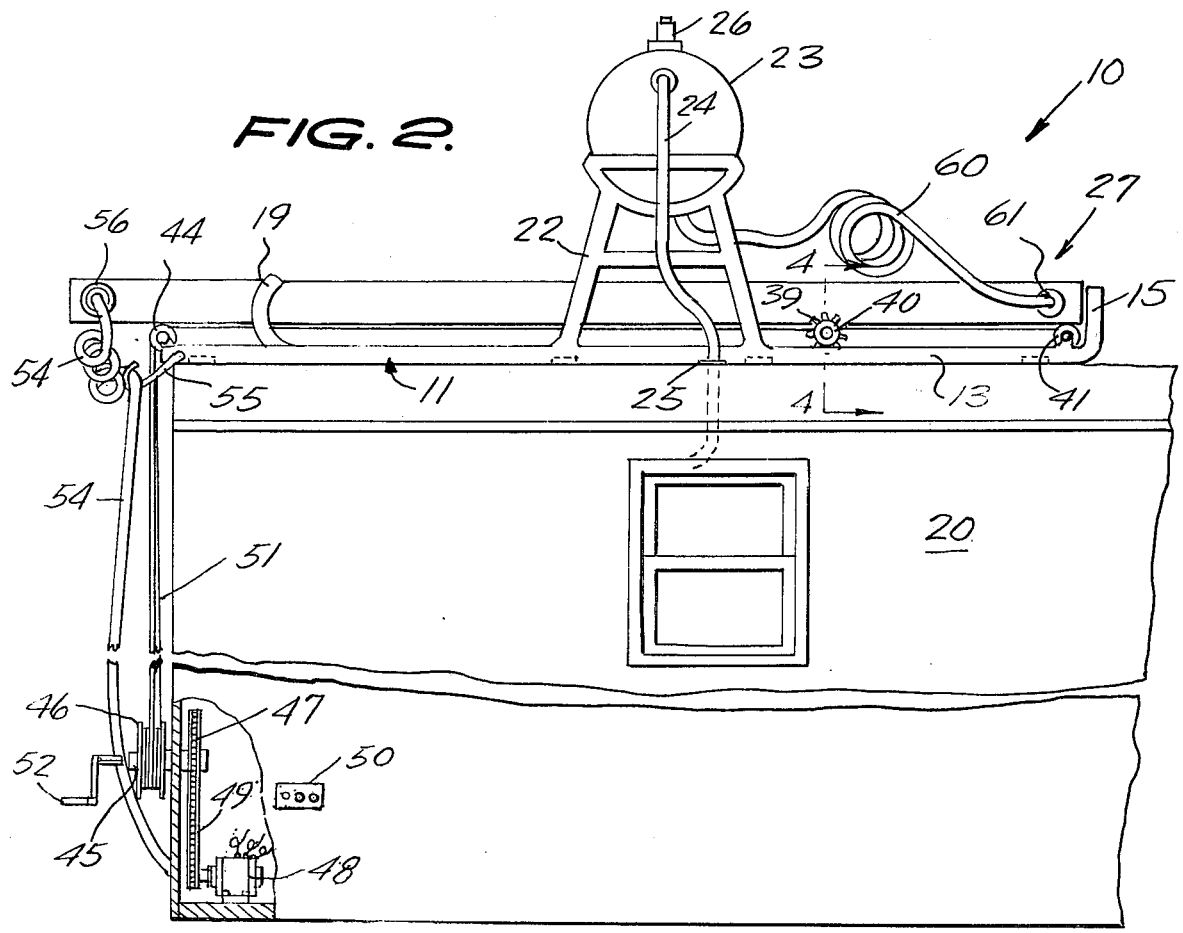
FIG. 2 is a view similar to FIG. 1 with the unit in stored position.
Figure 5:
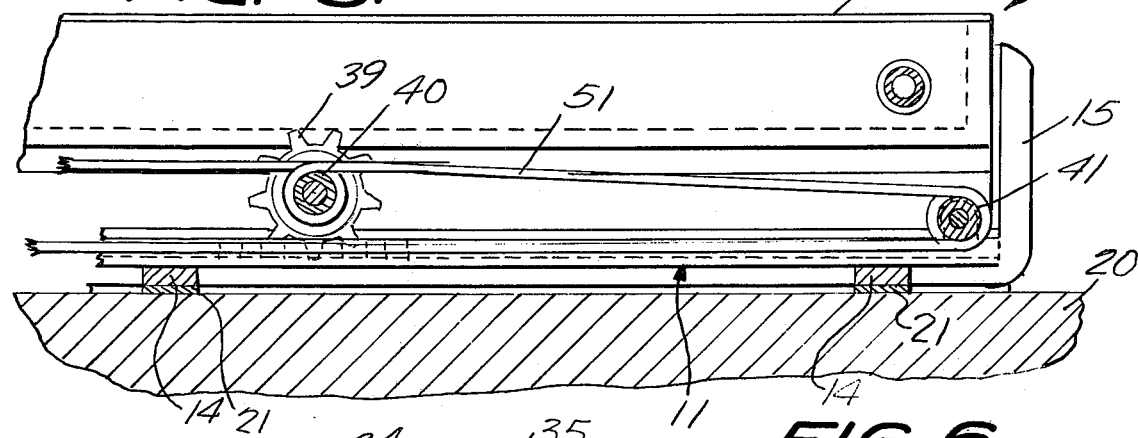
FIG. 5 is a fragmentary longitudinal sectional view taken on the line 5—5 of FIG. 4 looking in the direction of the arrows.
Figure 6:
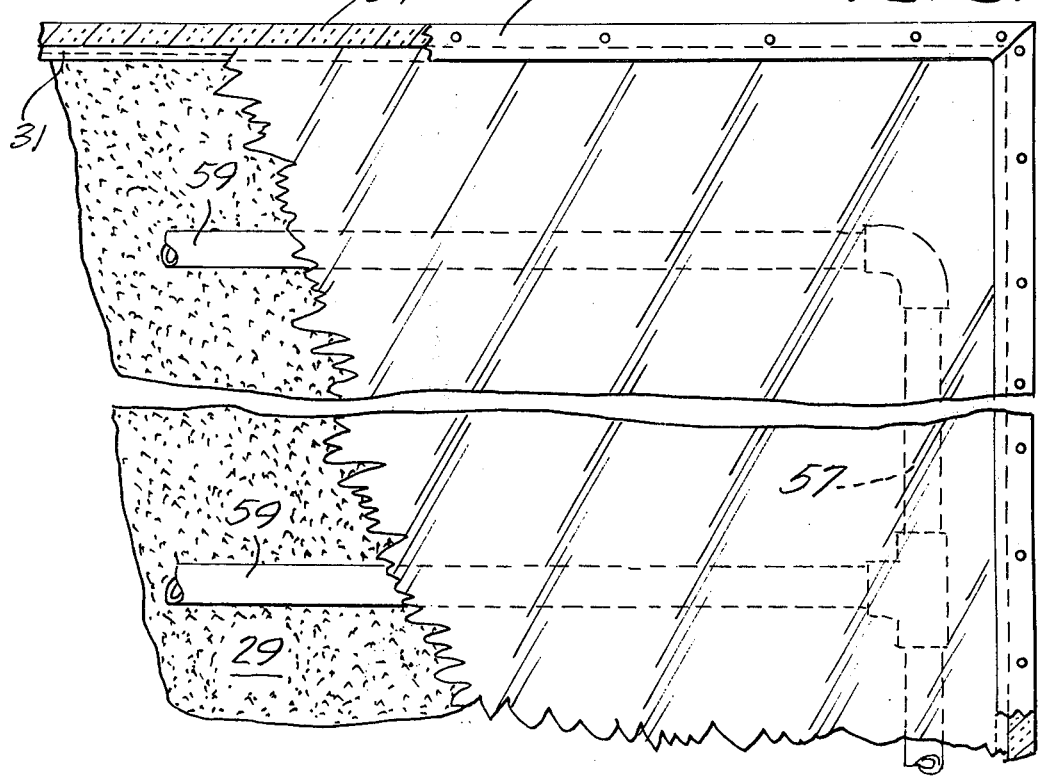
FIG. 6 is a fragmentary top plan view of the heat collector panel shown partially broken away and in section for convenience of illustration.

A drum 41 is journalled in the base member 11 adjacent to the front wall 15 as can be seen in FIGS. 2 and 5. An elongate shaft 42 extends between the rear ends of the longitudinal members 12, 13 and is journalled therein. A roller 43 is mounted on the shaft 42 and has pulleys 44 secured thereto and turning therewith. The pulleys 44, drum 40 and drum 41 are all arranged in longitudinally aligned relation. A shaft 45 extends through the rear wall of the vehicle 20 and has a drum 46 mounted on its outer end and a drive pulley 47 mounted on its inner end. A battery operated electric motor 48 is connected to the pulley 47 by a belt 49 and the motor 48 is controlled by push-button controls 50. An endless cable 51 is wrapped around the drum 46 several turns with both ends then passing up and over the pulleys 44 and forwardly where one leg is wrapped around the drum 40 while the opposite leg extends directly forwardly and around the drum 41.

Rotation of the drum 46 either by the electric motor 48 or the hand crank 52 will move the cable 51 and cause the spur gear 38, 39 to rotate with the shaft 37 so as to move the spur gears 38, 39 along the cog tracks 16, 17. As the spur gears 38, 39 reach the U-shaped end portions 18, 19 of the cog tracks 16, 17 they will climb the cog tracks 18, 19 as can be seen in FIG. 1 so as to elevate the forward end of the box 27 with the rear end of the box 27 extending outwardly over the end of the vehicle 20 to provide an awning thereover.

A ribbed plastic panel 53 is secured to the underside of the insulation 28 to provide a firm support therefor.

A flexible hose 54 extends from the box 27 to a source of cold water or to the outlet of heating radiators in the vehicle 20. A hook 55 secured to the frame member 13 supports the hose 54 to prevent it becoming entangled. The flexible hose 54 is secured to a fitting 56 forming a part of a header 57 within the box 27. A second header 58 at the opposite end of the box 27 is connected to the header 57 by a plurality of longitudinally extending conduits 59. A flexible hose 60 extends from a fitting 61 on the outer end of the header 58 to the bottom of the hot water tank 23.

In the use and operation of the invention the unit 10 is secured to the top of the vehicle with which it is to be used and the connections to extend through the vehicle walls are made. Water pressure controlled by a pressure regulator (not shown) then enters the unit through the conduit 54. The box 27 is moved to its rearward position rolling on the roller 43 and also supported by the spur gears 38, 39. As the box reaches its rearmost position the spur gears 38, 39 climb the U-shaped end portons 18, 19 of the cog tracks 16, 17. This permits the outer end of the box 27 to move downwardly to assume the desired angle for collecting heat therein. Moving the cable 51 in the opposite direction will move the box 27 forwardly until only a minor portion thereof overlaps the rear of the vehicle 20. The water entering the box 27 will be heated and moved through tank 23 under convection currents. As water is used from the tank 23 by domestic water usage or by radiator usage the water will be replenished and the cycle will be continuous. The conduits 57 and 59 can be cemented or otherwise secured to the bottom wall 29 if desired for conductance of heat.

Having thus described the preferred embodiment of the invention it should be understood that numerous structural modifications and adaptations may be resorted to without departing from the spirit of the invention.

What is claimed is:

1. A combined solar heater and awning unit for attachment to vehicles of the type having a generally flat horizontal roof comprising a base adapted to be supported on and adhesively secured to the vehicle roof, a pair of longitudinally extending spaced apart parallel cog tracks secured to said base, an insulated box having a glass or fiber-glass covered top, means including spur gears engaging in said cog tracks for supporting said box for longitudinal movement along said base, means at one end of said cog tracks engagable with said spur gears for raising one end of said box to position said box at an angle to the horizontal, means in said box for collecting solar heat in water, means extending from said box to supply water to be heated to said box, means extending from said box for conducting heated water to a place of use, means on said vehicle connected to said box for rotating said spur gears to move said box longitudinally on said vehicle.

2. A device as claimed in claim 1 wherein the means on said vehicle connected to said box includes an endless cable and means on said trailer for moving said endless cable.

3. A device as claimed in claim 1 wherein an insulated tank is mounted on said base and forms a part of the conduit extending from said box to a point of use.

4. A device as claimed in claim 3 wherein said box in its extended position slopes downwardly to shape one end of said vehicle.

5. A device as claimed in claim 1 wherein said cog tracks have U-shaped end portions to provide said means for raising one end of said box.

* * * * *